US012786267B2

(12) United States Patent
Sirota et al.

(10) Patent No.: US 12,786,267 B2
(45) Date of Patent: Nov. 3, 2026

(54) SYSTEMS AND METHODS FOR TRANSPARENT CONVERGENCE OF CLOUD AND ON-PREMISES DATA ANALYTICS AND SERVICES

(71) Applicant: JPMORGAN CHASE BANK, N.A., New York, NY (US)

(72) Inventors: Leon Sirota, Armonk, NY (US); Kevin Holsgrove, Edinburgh (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 7 days.

(21) Appl. No.: 18/784,181

(22) Filed: Jul. 25, 2024

(65) Prior Publication Data

US 2025/0039257 A1 Jan. 30, 2025

Related U.S. Application Data

(60) Provisional application No. 63/515,506, filed on Jul. 25, 2023.

(51) Int. Cl.

| | |
|---|---|
| ***G06F 15/16*** | (2006.01) |
| ***H04L 12/66*** | (2006.01) |
| ***H04L 67/1001*** | (2022.01) |
| ***H04L 67/1097*** | (2022.01) |

(52) U.S. Cl.

CPC .......... *H04L 67/1001* (2022.05); *H04L 12/66* (2013.01); *H04L 67/1097* (2013.01)

(58) Field of Classification Search

CPC .. H04L 67/1001; H04L 12/66; H04L 67/1097

See application file for complete search history.

(56) References Cited

U.S. PATENT DOCUMENTS

| | | | | |
|---|---|---|---|---|
| 9,032,081 | B1 * | 5/2015 | North | H04L 67/1006<br>709/227 |
| 11,038,746 | B2 * | 6/2021 | Lipkin | H04L 67/1097 |
| 11,588,819 | B1 * | 2/2023 | Wei | G06F 8/60 |
| 2003/0167295 | A1 * | 9/2003 | Choo | G06F 9/5083<br>718/104 |
| 2012/0106333 | A1 * | 5/2012 | Lee | H04L 47/125<br>709/241 |
| 2014/0115182 | A1 * | 4/2014 | Sabaa | H04L 67/1097<br>709/232 |

(Continued)

*Primary Examiner* — Razu A Miah

(74) *Attorney, Agent, or Firm* — GREENBERG TRAURIG LLP

(57) ABSTRACT

Systems and methods for transparent convergence of cloud and on-premises data analytics and services are disclosed. Embodiments may provide the ability to direct, use, and store, in a cloud environment, real-time streaming data originated by co-located platforms. The location of real-time data streams, which may be stored in memory or on disk, along with the historical data stores, may be transparent to data consumers (both internal and external) via gateway services and APIs. Embodiments may also provide the ability to sustain data spikes caused by highly volatile data sources (e.g., markets) that may exceed the physical capacity of on-premises services. In a manner transparent to end-users, embodiments may empower the low-latency on-premises services with the infinite scalability of cloud resources.

20 Claims, 4 Drawing Sheets

(56) References Cited

U.S. PATENT DOCUMENTS

| | | | | |
|---|---|---|---|---|
| 2015/0128215 | A1* | 5/2015 | Son | H04L 63/102 707/827 |
| 2016/0380906 | A1* | 12/2016 | Hodique | G06Q 30/0206 709/226 |
| 2017/0187820 | A1* | 6/2017 | Vangala | H04L 45/54 |
| 2018/0054475 | A1* | 2/2018 | Agarwal | H04L 67/1048 |
| 2018/0139305 | A1* | 5/2018 | Thibeault | G06F 16/2457 |
| 2018/0270310 | A1* | 9/2018 | Venkatesan | H04L 12/2836 |
| 2018/0343292 | A1* | 11/2018 | Pujadas | H04N 21/2387 |
| 2020/0167445 | A1* | 5/2020 | Kwon | G06F 21/6218 |
| 2020/0379817 | A1* | 12/2020 | Vaikar | G06F 9/5072 |
| 2022/0141662 | A1* | 5/2022 | Liao | H04W 12/08 726/1 |
| 2023/0076778 | A1* | 3/2023 | Laurenti | H04L 67/1001 |
| 2023/0169126 | A1* | 6/2023 | Poston | H04L 67/1004 707/737 |
| 2023/0185957 | A1* | 6/2023 | Brown | G06Q 50/01 726/26 |
| 2023/0198987 | A1* | 6/2023 | Wei | H04L 67/1004 726/1 |
| 2023/0281338 | A1* | 9/2023 | Zhang | H04L 63/0421 726/1 |

* cited by examiner

SYSTEMS AND METHODS FOR TRANSPARENT CONVERGENCE OF CLOUD AND ON-PREMISES DATA ANALYTICS AND SERVICES

RELATED APPLICATIONS

This application claims priority to U.S. Provisional patent application Ser. No. 63/515,506, filed Jul. 25, 2023, the disclosure of which is hereby incorporated, by reference, in its entirety.

BACKGROUND OF THE INVENTION

1. Field of the Invention

Embodiments are generally directed to systems and methods for transparent convergence of cloud and on-premises data analytics and services.

2. Description of the Related Art

When data is split between on-premises storage and cloud storage, it may be difficult to locate data. This can result in data being lost, or time wasted trying to find the data.

SUMMARY OF THE INVENTION

Systems and methods for transparent convergence of cloud and on-premises data analytics and services are disclosed. In one embodiment, a method may include: (1) receiving, at an on-premises gateway, a request for data from a user via an on-premises server; (2) determining, by the on-premises gateway, that the data is in cloud storage. (3) routing, by the on-premises gateway, the request to a network gateway; (4) retrieving, by the network gateway, an identification of a nodegroup out of a plurality of nodegroups for the request from a resource coordinator; (5) receiving, by the network gateway, the data from the identified nodegroup; (6) receiving, by the on-premises gateway, the data from the network gateway; and (7) returning, by the on-premises gateway, the data to the user via the on-premises server.

In one embodiment, the on-premises gateway routes the request to a network load balancer, which selects the network gateway out of a plurality of network gateways.

In one embodiment, the network gateway may be selected based on workload or latency.

In one embodiment, the resource coordinator stores a mapping of nodegroups to a type of data stored in each nodegroup.

In one embodiment, the resource coordinator stores a mapping of nodegroups to a line of business for each nodegroup.

In one embodiment, the data may be stored in real-time data storage, intraday data storage, or historical data storage for the identified nodegroup.

In one embodiment, an aggregator aggregates the data from the identified nodegroup before it is received by the network gateway.

According to another embodiment, a system may include: an on-premises server executing an on-premises gateway; on-premises storage collocated with the on-premises server; cloud storage comprising a plurality of nodegroups; a resource coordinator that identifies data in each of the plurality of nodegroups; and a network gateway in communication with the on-premises gateway and the cloud storage. The on-premises gateway may be configured to receive a request for data from a user, to determine the data is in cloud storage, and to route the request to the network gateway; the network gateway may be configured to retrieve an identification of one of the nodegroups for the request from the resource coordinator, to receive the data from the identified nodegroup, and to provide the data to the on-premises gateway, the data from the network gateway; and the on-premises gateway may be further configured to return the data to the user via the on-premises server.

In one embodiment, the system may also include a plurality of network gateways; and a network load balancer. The on-premises gateway may be further configured to route the request to the network load balancer, and the network load balancer may be configured to select one of the network gateways out of a plurality of network gateways.

In one embodiment, the network gateway may be selected based on workload or latency.

In one embodiment, the resource coordinator stores a mapping of each of the nodegroups to a type of data stored in each nodegroup.

In one embodiment, the resource coordinator stores a mapping of nodegroups to a line of business for each nodegroup.

In one embodiment, the nodegroup may include real-time data storage, intraday data storage, and historical data storage, and the data may be stored in the real-time data storage, intraday data storage, and historical data storage according to a configurable time setting.

In one embodiment, the system may also include an aggregator that may be configured to aggregate the data from the identified nodegroup before it is received by the network gateway.

According to another embodiment, a non-transitory computer readable storage medium may include instructions stored thereon, which when read and executed by one or more computer processors, cause the one or more computer processors to perform steps comprising: receiving, via an on-premises gateway, a request for data from a user via an on-premises server; determining, via the on-premises gateway, that the data is in cloud storage; routing, via the on-premises gateway, the request to a network gateway; retrieving, via the network gateway, an identification of a nodegroup out of a plurality of nodegroups for the request from a resource coordinator; receiving, via the network gateway, the data from the identified nodegroup; receiving, via the on-premises gateway, the data from the network gateway; and returning, via the on-premises gateway, the data to the user via the on-premises server.

In one embodiment, the non-transitory computer readable storage medium may also include instructions stored thereon, which when read and executed by the one or more computer processors, cause the one or more computer processors to perform steps comprising: routing, via the on-premises gateway, the request to a network load balancer; and selecting, via the network load balancer, the network gateway out of a plurality of network gateways.

In one embodiment, the network gateway may be selected based on workload or latency.

In one embodiment, the resource coordinator stores a mapping of nodegroups to a type of data stored in each nodegroup and/or to a line of business for each nodegroup.

In one embodiment, the data may be stored in real-time data storage, intraday data storage, or historical data storage for the identified nodegroup.

In one embodiment, the non-transitory computer readable storage medium may also include instructions stored thereon, which when read and executed by the one or more computer processors, cause the one or more computer processors to perform steps comprising: aggregating, via an aggregator, the data from the identified nodegroup before it is received by the network gateway.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for transparent convergence of cloud and on-premises data analytics and services are disclosed.

Embodiments may provide the ability to direct, use, and store, in a cloud environment, real-time streaming data originated by co-located platforms. The location of real-time data streams, which may be stored in memory or on disk, along with the historical data stores, may be transparent to data consumers (both internal and external) via gateway services and APIs.

Embodiments may also provide the ability to sustain data spikes caused by highly volatile data sources (e.g., markets) that may exceed the physical capacity of on-premises services. In a manner transparent to end-users, embodiments may empower the low-latency on-premises services with the infinite scalability of cloud resources.

Figure 1:
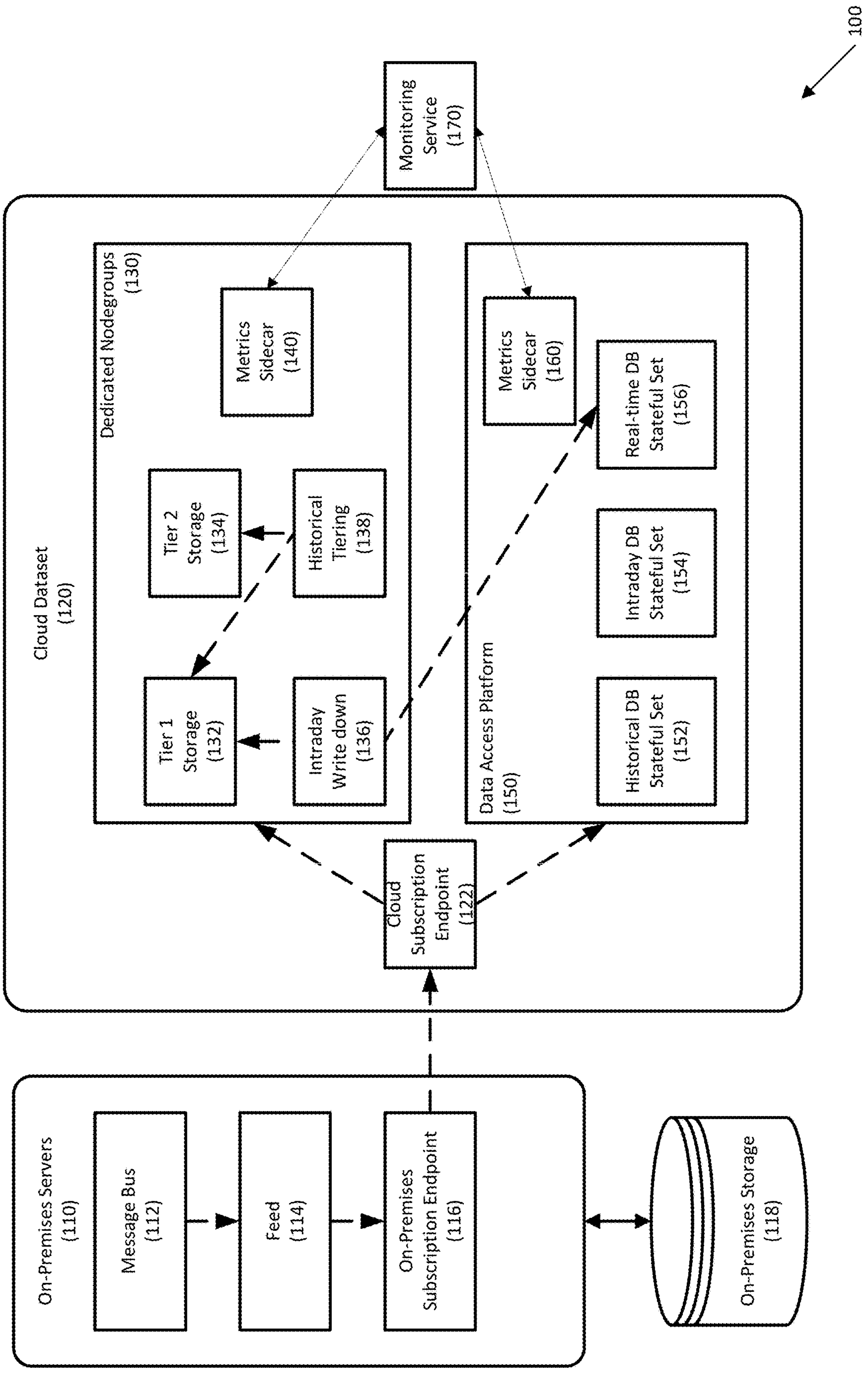
FIG. 1 illustrates a system for transparent convergence of cloud and on-premises data analytics and services according to an embodiment.

Referring to FIG. 1, a system for transparent convergence of cloud and on-premises data analytics and services is disclosed according to an embodiment. System 100 may include one or more on-premises servers 110, which may include message bus 112, feed 114, and on-premises subscription endpoint 116. On-premises servers 110 may access data stored in on-premises storage 118, which may be any suitable storage.

On-premises subscription endpoint 116 may interface with cloud subscription endpoint 122 in cloud dataset 120 and may send data to or from dedicated nodegroups 130 or data access platform 150. In one embodiment, dedicated nodegroups 130 may be assigned to a line of business, a group of users, a type of data, etc.

Dedicated nodegroups 130 may include one or more levels of storage (e.g., Tier 1 storage 132, Tier 2 storage 134, etc.). Dedicated nodegroups 130 may also include intraday writedown module 136 that may execute write downs, historical tiering module 138, and metrics sidecar module 140.

Data access platform 150 may include historical database ("DB") stateful set 152, intraday DB stateful set 154, and real-time DB stateful set 156. Each database 152, 154, 156 may store data for a certain period of time, such as real-time/substantially real-time (e.g., under 1 hour), intraday (e.g., within 24 hours), or historical (e.g., longer than 24 hours). Note that these timings are exemplary only and different timings may be used as is necessary and/or desired.

In one embodiment, at the end of a configurable period, data may be moved from, for example, real-time DB stateful set 156 to intraday DB stateful set 154, and then to historical DB stateful set 152.

In one embodiment, data may be written from intraday write down module 136 to real-time DB stateful set 156, and data may move from real-time DB stateful set 156 to intraday DB stateful set, 154 and then to historical DB stateful set 152 as time progresses.

Metrics sidecar 140 may collect metrics (e.g., utilization rates, etc.) for elements in dedicated nodegroups 130, and may communicate the metrics to metrics sidecar 160 via monitoring service 170.

Metrics sidecar 160 may perform substantially similar functions as metrics sidecar module 140, and both may communicate via monitoring service 170. Monitoring service 170 may use metrics from metrics sidecar 140 and metrics sidecar 160 to determine performance metrics of dedicated nodegroup 130 and/or data access platform 150.

Figure 2:
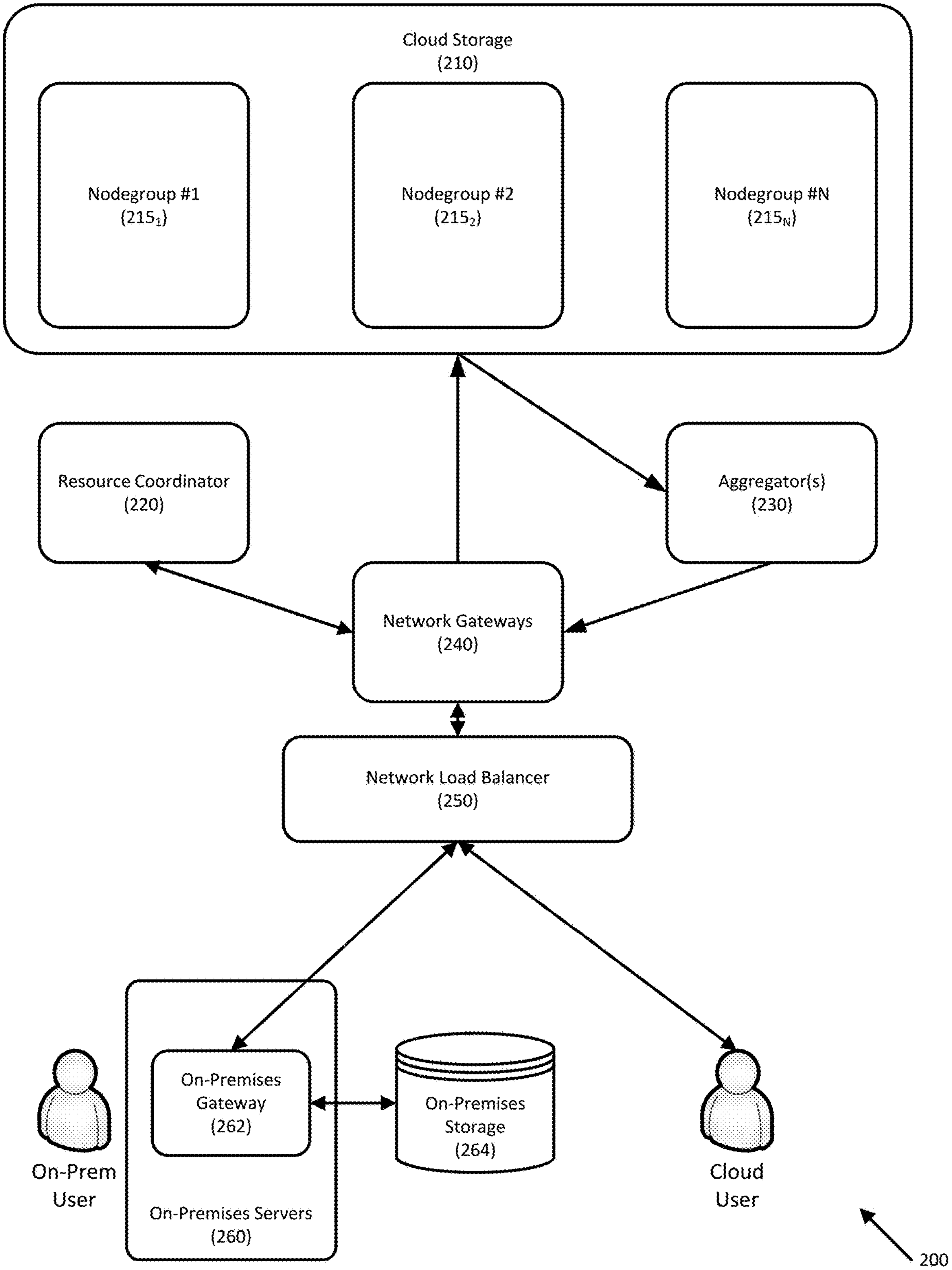
FIG. 2 illustrates a system for transparent convergence of cloud and on-premises data analytics and services according to an embodiment.

Referring to FIG. 2, a system for transparent convergence of cloud and on-premises data analytics and services is disclosed according to another embodiment. System 200 may include one or more on-premises servers 260, which may be similar to on-premises servers 110. On-premises servers 260 may include on-premises gateway 262 and may communicate with on-premises storage 264. On-premises gateway 262 may receive a data request from an on-premises user and may route the data request to on-premises storage 264 or to network load balancer 250 if the data is stored in cloud storage 210.

In one embodiment, on-premises servers 260 may be co-located with on-premises storage 264. For example, on-premises servers 260 and on-premises storage 264 may be located in the same building, geographical area, etc.

Network load balancer 250 may receive a data request from on-premises gateway 262 and may identify one of a plurality of network gateways 240 to receive the data request. Any suitable load-balancing scheme (e.g., workload, latency minimization, geography, etc.) may be used as is necessary and/or desired.

Network gateways 240 may receive data requests and may access resource coordinator 220, which may be a database, to identify which nodegroup (e.g., nodegroup #1 $\mathbf{215}_1$, nodegroup #2 $\mathbf{215}_2$, nodegroup #N $\mathbf{215}_N$) that stores the requested data. For example, the data may be stored in the nodegroups 215 according to line of business, groups of individuals, data type, data use, etc. Once network gateways 240 receive an identification of the nodegroup that stores the data, the request may be routed to the identified nodegroup.

One or more aggregators 230 may receive the data from the identified nodegroup and may aggregated the data before returning the data to the requesting network gateway 240, which may then return the aggregated data to the user via network load balancer 250 and on-premises gateway 262.

Figure 3:
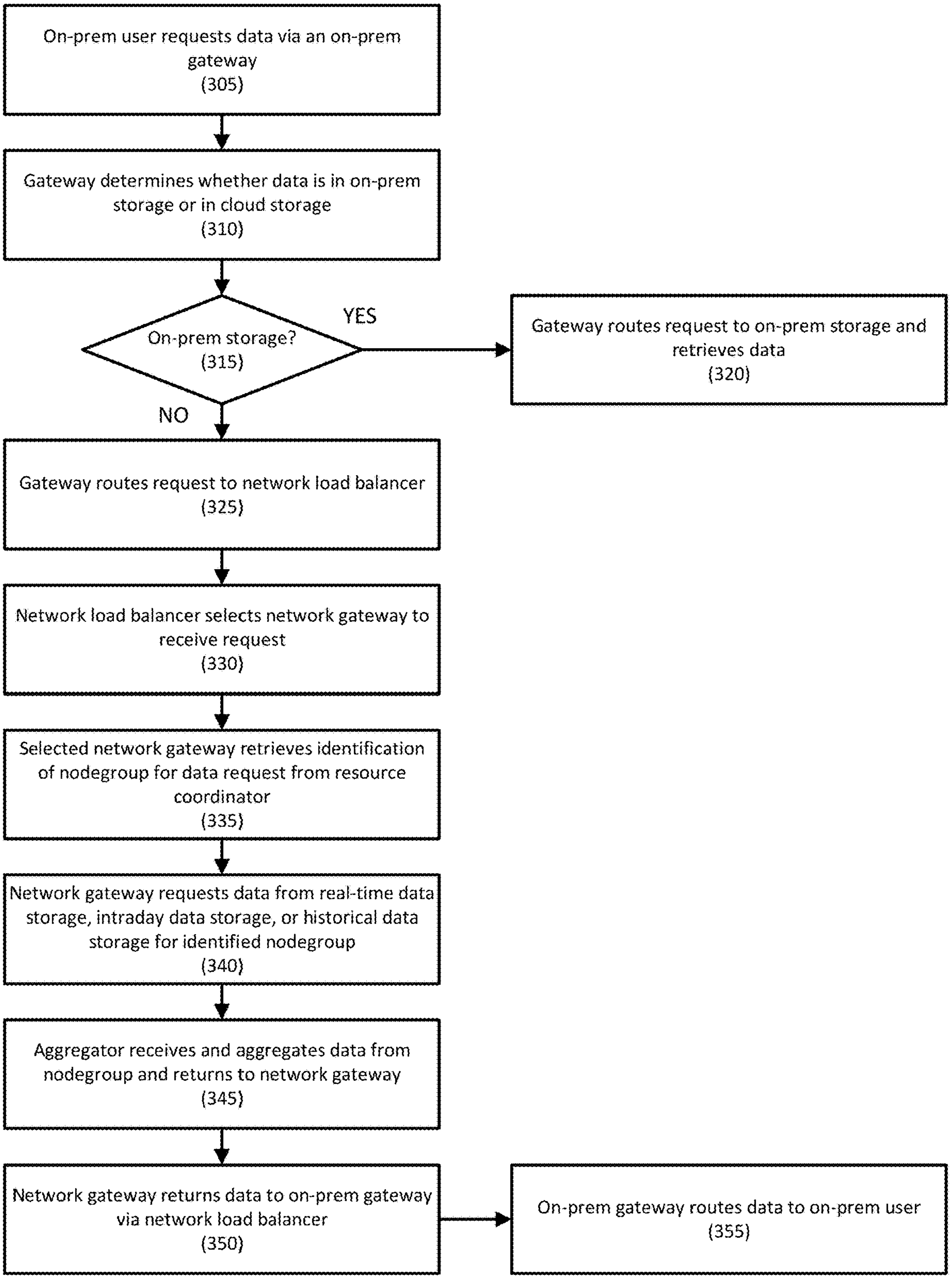
FIG. 3 illustrates a method for transparent convergence of cloud and on-premises data analytics and services according to an embodiment.

Referring to FIG. 3, a method for transparent convergence of cloud and on-premises data analytics and services is disclosed according to an embodiment.

In step 305, an on-premises user (e.g., a user that is accessing data via an organizational server) may request data via an on-premises gateway.

In step 310, the on-premises gateway may determine whether the requested data is in on-premises storage or in cloud storage.

In step 315, if the requested data is in on-premises storage, in step 320, the gateway may route the request to on-premises storage and may retrieve the requested data. The data may then be presented to the on-premises user.

If the data is not stored in on-premises storage, in step 325, the on-premises gateway may route the request to a network load balancer.

In step 330, the network load balancer may select a network gateway to receive the request. The network gateway selection may be based on any load-balancing practice, including workload, latency, etc.

In step 335, the selected network gateway may retrieve an identification of a nodegroup for the data request from a resource coordinator. For example, the resource coordinator may store a mapping of nodegroups to the type of data stored in the nodegroup, an associated line of business for the nodegroup, etc.

In step 340, the network gateway may request the data from real-time data storage, intraday data storage, or historical data storage for the identified nodegroup.

In step 345, an aggregator may receive the data from the nodegroup and may aggregate the data. It may then return the aggregated data to the network gateway.

In step 350, the network gateway may return the aggregated data to the on-premises gateway via the network load balancer.

In step 355, the on-premises gateway may return the data to the on-premises user.

Figure 4:
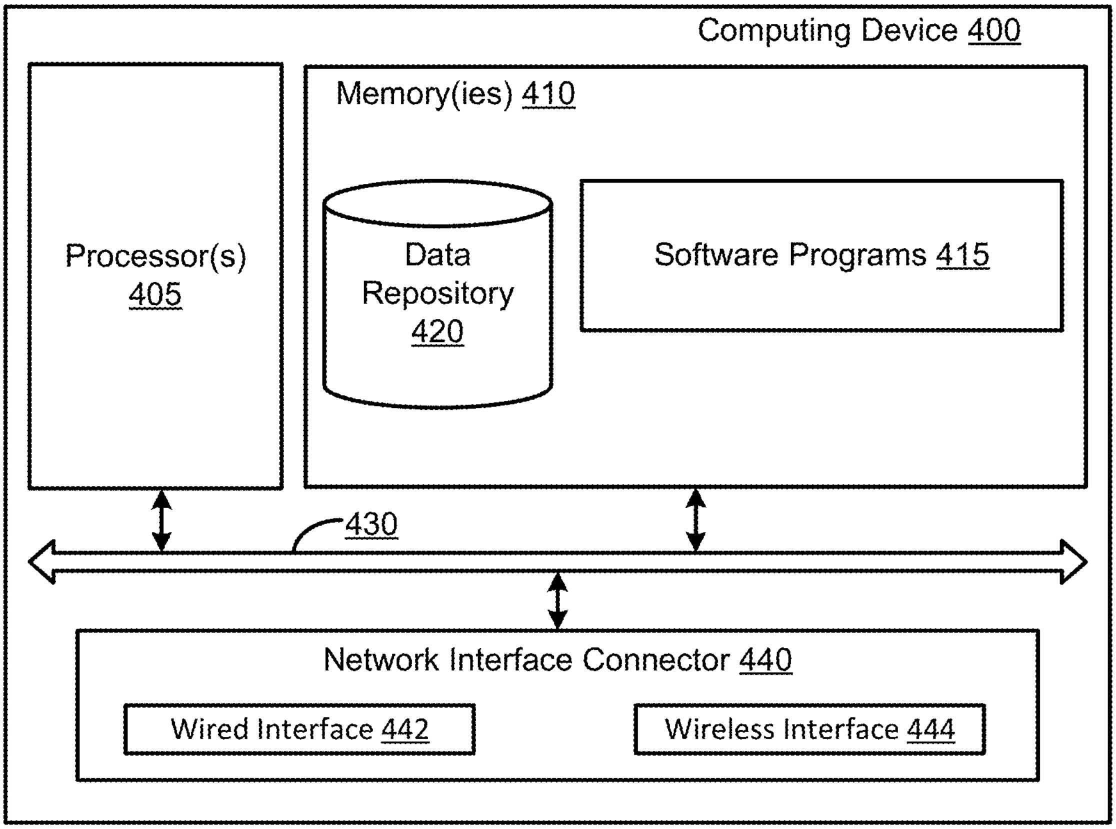
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method, comprising:

receiving, at an on-premises gateway, a request for data from a user via an on-premises server;

determining, by the on-premises gateway, whether the data is stored in on-premises storage or in cloud storage;

routing, by the on-premises gateway, the request to a network gateway in response to determining that the data is stored in cloud storage;

retrieving, by the network gateway, an identification of a nodegroup out of a plurality of nodegroups for the request from a resource coordinator, wherein each of the plurality of nodegroups comprises a plurality of levels of storage;

receiving, by the network gateway, the data from the identified nodegroup;

receiving, by the on-premises gateway, the data from the network gateway; and returning, by the on-premises gateway, the data to the user via the on-premises server.

2. The method of claim 1, wherein the on-premises gateway routes the request to a network load balancer, which selects the network gateway out of a plurality of network gateways.

3. The method of claim 2, wherein the network gateway is selected based on workload or latency.

4. The method of claim 1, wherein the resource coordinator stores a mapping of nodegroups to a type of data stored in each nodegroup.

5. The method of claim 1, wherein the resource coordinator stores a mapping of nodegroups to a line of business for each nodegroup.

6. The method of claim 1, wherein the data is stored in real-time data storage, intraday data storage, or historical data storage for the identified nodegroup.

7. The method of claim 1, wherein an aggregator aggregates the data from the identified nodegroup before it is received by the network gateway.

8. A system, comprising:

an on-premises server executing an on-premises gateway;

on-premises storage collocated with the on-premises server;

cloud storage comprising a plurality of nodegroups, wherein each of the plurality of nodegroups comprises a plurality of levels of storage;

a resource coordinator that identifies data in each of the plurality of nodegroups; and a network gateway in communication with the on-premises gateway and the cloud storage;

wherein the on-premises gateway is configured to receive a request for data from a user, to determine whether the data is stored in the on-premises storage or in the cloud storage, and to route the request to the network gateway in response to determining that the data is stored in cloud storage;

routing, by the on-premises gateway, the request to a network gateway wherein the network gateway is configured to retrieve an identification of one of the nodegroups for the request from the resource coordinator, to receive the data from the identified nodegroup, and to provide the data to the on-premises gateway, the data from the network gateway; and wherein the on-premises gateway is further configured to return the data to the user via the on-premises server.

9. The system of claim 8, further comprising:

a plurality of network gateways; and a network load balancer;

wherein the on-premises gateway is further configured to route the request to the network load balancer, and the network load balancer is configured to select one of the network gateways out of a plurality of network gateways.

10. The system of claim 9, wherein the network gateway is selected based on workload or latency.

11. The system of claim 8, wherein the resource coordinator stores a mapping of each of the nodegroups to a type of data stored in each nodegroup.

12. The system of claim 8, wherein the resource coordinator stores a mapping of nodegroups to a line of business for each nodegroup.

13. The system of claim 8, wherein the nodegroup comprises real-time data storage, intraday data storage, and historical data storage, and the data is stored in the real-time data storage, intraday data storage, and historical data storage according to a configurable time setting.

14. The system of claim 8, further comprising:

an aggregator that is configured to aggregate the data from the identified nodegroup before it is received by the network gateway.

15. A non-transitory computer readable storage medium, including instructions stored thereon, which when read and executed by one or more computer processors, cause the one or more computer processors to perform steps comprising:

receiving, via an on-premises gateway, a request for data from a user via an on-premises server;

determining, via the on-premises gateway, whether the data is stored in on-premises storage or in cloud storage;

routing, via the on-premises gateway, the request to a network gateway in response to determining that the data is stored in cloud storage;

retrieving, via the network gateway, an identification of a nodegroup out of a plurality of nodegroups for the request from a resource coordinator, wherein each of the plurality of nodegroups comprises a plurality of levels of storage;

receiving, via the network gateway, the data from the identified nodegroup;

receiving, via the on-premises gateway, the data from the network gateway; and returning, via the on-premises gateway, the data to the user via the on-premises server.

16. The non-transitory computer readable storage medium of claim 15, further including instructions stored thereon, which when read and executed by the one or more computer processors, cause the one or more computer processors to perform steps comprising:

routing, via the on-premises gateway, the request to a network load balancer; and selecting, via the network load balancer, the network gateway out of a plurality of network gateways.

17. The non-transitory computer readable storage medium of claim 16, wherein the network gateway is selected based on workload or latency.

18. The non-transitory computer readable storage medium of claim 15, wherein the resource coordinator stores a mapping of nodegroups to a type of data stored in each nodegroup and/or to a line of business for each nodegroup.

19. The non-transitory computer readable storage medium of claim 15, wherein the data is stored in real-time data storage, intraday data storage, or historical data storage for the identified nodegroup.

20. The non-transitory computer readable storage medium of claim 15, further including instructions stored thereon, which when read and executed by the one or more computer processors, cause the one or more computer processors to perform steps comprising:

aggregating, via an aggregator, the data from the identified nodegroup before it is received by the network gateway.

* * * * *